Lindsay & Cameron,
Tobacco Press,
No. 1,124, Reissued Jan. 15, 1861.
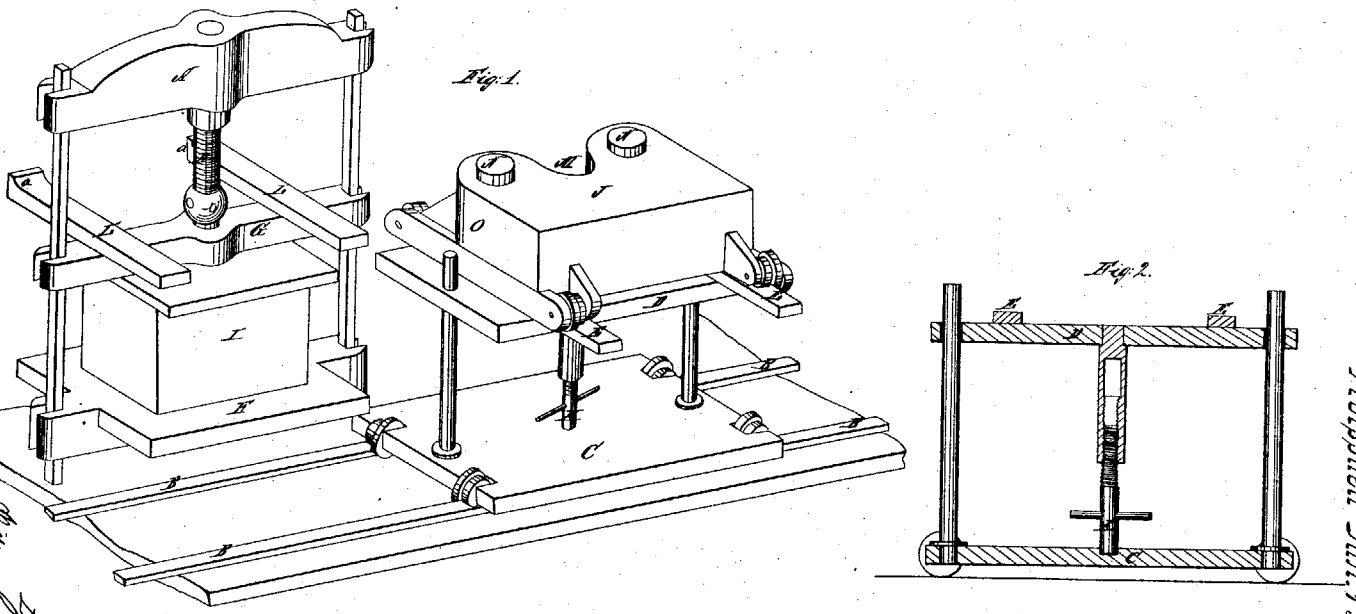
Witnesses:
J. Cohen
Selim Heath
Inventor:
William Cameron, for himself
and as for assignee of George Lindsay.
By Atty A.B. Stoughton
AM. PHOTO-LITHO. CO. N.Y. (OSBORNE'S PROCESS)

UNITED STATES PATENT OFFICE.

GEO. LINDSAY AND WM. CAMERON, OF PETERSBURG, VIRGINIA, ASSIGNORS TO WM. CAMERON.

IMPROVEMENT IN TOBACCO-PRESSES.

Specification forming part of Letters Patent No. 25,427, dated September 13, 1859; Reissue No. 1,124, dated January 15, 1861.

*To all whom it may concern:*

Be it known that GEORGE LINDSAY and WILLIAM CAMERON, of Petersburg, in the county of Dinwiddie and State of Virginia, did invent certain new and useful Improvements in Tobacco-Presses; and I do hereby declare that the following is a full, clear, and exact description of the same, reference being had to the accompanying drawings, making a part of this specification, in which—

Figure 1 represents in perspective so much of a portable hydraulic press and a stationary retaining-press as will illustrate the invention. Fig. 2 represents a vertical section through a truck-frame, by which the hydraulic press is moved, adjusted, and run under or from under the beam of the stationary press or presses, that are termed the "retainers."

Similar letters, where they occur in the separate figures, denote like parts of the apparatus in both.

In the combined use of a very powerful press with a less expensive retaining-press, in pressing or packing tobacco, two plans have heretofore been devised and patented. One by means of a lever and geared press that was stationary, and made to operate in connection with portable stands or retainers that were portable. This combination of press and retainer serves an excellent purpose, and the only objection that could be urged against its use is the expense of working it, together with the amount of room it took up in the factory, neither of which objections touch the mechanical construction of this apparatus, but only that of expense. The second plan was to substitute a more powerful and compact and a less expensively operated press for that of the lever and geared press. This was my own invention, and by it I made a hydraulic press, or rather the power of a hydraulic press, available to the pressing and retaining under that pressure of tobacco and other material. The hydraulic press could not profitably be used for a retaining-press, for two reasons—viz., the expense of its construction; but more particularly its inability to stand under heavy pressure, from the mechanical impossibility of packing its joints tight enough to prevent leakage under oft-repeated and ponderous pressure. But by taking up and retaining its power upon a second press or stand which was simple and cheap in its construction, I made the hydraulic press a valuable adjunct in the pressing and retaining of tobacco, &c., under heavy pressure. In this last-named invention, however, the hydraulic press was a fixture, and the retainers were portable, and, so made, worked advantageously and with great profit and economy. In still further pursuing this subject of the combined action and effect of a hydraulic press with a retaining-press, GEORGE LINDSAY and WILLIAM CAMERON discovered that the hydraulic press could be made portable and that the retainers could be stationary. This was not mere substitution of one thing for another without a beneficial result, because it made available a kind of press well known and in use in many factories supplied with them, or preferred on account of their well-understood operation and management.

The invention, therefore, of the said GEORGE LINDSAY and WILLIAM CAMERON consisted in the application to a fixed press, or series of fixed presses of a well-known construction, of a portable hydraulic press which moved around and imparted to these more common presses its great power, and left them to retain it upon the tobacco for any length of time required, while it could be transported elsewhere to perform a similar duty to other retaining-presses. The principle or function of this portable hydraulic press is the same as that of the stationary hydraulic press, as described and used in a patent granted to me on November 9, 1858—viz., to transmit its own great power, through a secondary press, to the material to be pressed, the secondary press having the capacity to retain that power while the hydraulic press itself could not do so, for reasons above mentioned; but the application of this great power in a portable shape to a series of ordinary beam or other presses that were stationary or not portable involved time, skill, and inventive genius, notwithstanding the former discovery and use of the principle involved.

To enable others skilled in the art to make and use this invention, I will proceed to describe the same with reference to the drawings.

A may represent one of a tier of old-fashioned presses of common construction, and such as are now used. To make such a press, or a series of them, available, a track or tramway, B, may for convenience be laid down behind the tier or series of presses. On this track may be run a truck, C, which carries an adjustable platform, D, on it, the platform being provided with a track, E, at right angles to that B; and upon this platform and track is placed a portable and powerful press, (the one represented being a hydraulic jack,) but of course other power may be substituted for it. This constitutes substantially the whole apparatus, in a general point of view. The detail of its construction, so far as is necessary to a full understanding of the apparatus, will be described in connection with the description of the operation of the machine. The box I, containing the tobacco, or the series of boxes or boards in or between which the tobacco is to be pressed, are placed upon a bed, F, and the follower G, or the other appliance for transmitting the power from the press to the tobacco, is run up or down, by a screw or otherwise, until in condition to apply the hydraulic press, the above being a primary operation before the real pressing takes place. When a tier or series of screw, beam, or other presses are thus arranged, the truck C is run along on its ways until it brings its hydraulic press or jack J in proper position for applying it to the press or series of presses or retainers. The platform D is then raised or lowered, as the case may be, by means of the screw K or its equivalent, until the rails E are on the same horizontal plane with those L, and the jack or hydraulic press J is run onto the rails L, or under the beam A of the retaining press or presses. The jack is now ready to be operated, and when its followers or pistons N reach the beam A, so as to take upon itself the strain (if any) that was on the retainer or retainers, then the screw H is detached from the follower or cross-head G, which may be done by simply drawing a pin, and the jack or hydraulic press will run up or down the follower, cross-head, or beam G until there is sufficient pressure upon the tobacco, when the screw or any other retaining mechanism may be run down or fastened to the follower or beam G, so as to receive, take, and hold the pressure put on by the jack. The jack is now let down, run back onto its track or truck, and may be moved to the next press or tier or series of presses, where another similar operation may be gone through with, each press or series of presses in turn receiving and retaining the greater pressure put upon the tobacco by the jack, or other more powerful press than they are, and this pressure is retained upon the tobacco until it has set, or as long as may be necessary to an efficient packing of the tobacco, and which packed condition preserves it against injury by dampness or dryness. The ways or rails L L are rounded up at their ends *a a*, so that when the jack is run onto them its chamber O shall rest upon the rails, instead of its wheels, upon which it is moved. The two pistons N equalize the pressure on the follower or beam G by applying the power at each side of, instead of at the center, though one may be used. The only additions that need be made to the ordinary well-known and commonly-used presses to make them available in connection with the hydraulic press or jack are the rails or ways for moving them to, under, or from the common press.

Having thus fully described the nature and object of this invention, what is claimed therein as new is—

The combination of a portable hydraulic press or jack with a stationary retaining-press or series or tier of retaining-presses, when operating together, for the purpose and substantially in the manner herein represented.

WILLIAM CAMERON.

Witnesses:

ROBERT CRAWFORD,
GEORGE CAMERON.